United States Patent
Ueda et al.

(10) Patent No.: US 6,422,572 B1
(45) Date of Patent: Jul. 23, 2002

(54) METAL GASKET

(75) Inventors: Katsunori Ueda; Shunichi Searashi, both of Aichi (JP)

(73) Assignee: Nichias Corporation, Tokyo (JP)

( * ) Notice: Subject to any disclaimer, the term of this patent is extended or adjusted under 35 U.S.C. 154(b) by 0 days.

(21) Appl. No.: 09/510,744

(22) Filed: Feb. 22, 2000

(30) Foreign Application Priority Data

Feb. 24, 1999 (JP) .............................. 11-046277

(51) Int. Cl.⁷ ................................................ F02F 11/00
(52) U.S. Cl. ........................ 277/591; 277/593; 277/594
(58) Field of Search .............................. 277/591, 593, 277/594, 595

(56) References Cited

U.S. PATENT DOCUMENTS

| | | | | |
|---|---|---|---|---|
| 5,087,058 A | * | 2/1992 | Miura et al. ................. | 277/595 |
| 5,375,856 A | * | 12/1994 | Ishikawa et al. ............. | 277/595 |
| 5,544,629 A | * | 8/1996 | Ohata et al. ............ | 123/184.36 |
| 5,601,294 A | * | 2/1997 | Stritzke ....................... | 277/597 |
| 6,182,976 B1 | * | 2/2001 | Maekawa et al. ............ | 277/595 |

* cited by examiner

*Primary Examiner*—Anthony Knight
*Assistant Examiner*—Enoch Peavey
(74) *Attorney, Agent, or Firm*—Flynn, Thiel, Boutell & Tanis, P.C.

(57) ABSTRACT

In order to provide a metal gasket suitable for use for a flange made of synthetic resin, the metal gasket disposed between a resin flange and an aluminium flange is composed of two elastic metal plates, on each of which a half bead is formed, and which are superposed on each other to be jointed so that half beads are directed opposite to each other.

Since bending in a state, where the gasket is tightened, can be suppressed to an extremely small value at a same level in the case where the flanges are tightened without gasket, it is possible to remove worsening in flatness (planarity) of the resin flange.

4 Claims, 6 Drawing Sheets

METAL GASKET

FIELD OF THE INVENTION

The present invention relates to a metal gasket and in particular to a metal gasket suitable for use for a flange made of synthetic resin.

DESCRIPTION OF THE PRIOR ART

Heretofore a flange used in an inlet system of an engine has been made in general of aluminium. However, recently, there is a tendency that synthetic resin obtained e.g. by reinforcing 6-nylon with glass fiber is used therefor.

This is because it is possible to intend further weight and cost reduction owing to this material change.

However, in case where synthetic resin is used for a flange, there are a number of conditions, that it has a low rigidify, that it has a large thermal strain (deformation when it is heated), that deformation due to external force is great, etc., under which it is difficult to secure the sealing property as a gasket, compared with the case where the flange is made of aluminium.

The major part of gaskets used for such flanges made of synthetic resin are products made of rubber, e.g. rubber O-rings. This is because a large amount of compression and resilience can be obtained thereby by a small load.

FIG. 10 shows an example of construction, in which a rubber product sealing member B is used between a resin flange 1 and an aluminium flange 2. A groove 1a, into which the rubber product sealing member B is inserted, is formed in the resin flange 1.

In case where the product made of rubber (rubber O-ring) is used as a gasket, since permanent strain remains due to influences of temperature or with the passage of time, there are problems that so-called buckling is great, that the sealing property is easily damaged by vibrating load, that reliability is low for long term use, etc. Since there is a trend that the guaranty term of vehicles is elongated (e.g. 100,000 km to 300,000 km), such lowering in reliability due to buckling should be suppressed.

Although it can be thought to change the rubber material from HNBR to fluorocarbon rubber, fluorosilicone rubber, etc., taking the worsening in the sealing property due to buckling into account, the sealing property is worsened at low temperatures, if fluorocarbon rubber is used, and further cost is considerably raised, if fluorosilicone rubber is used.

In addition, since the product made of rubber has no definite shape, it has another problem that mounting thereof on a flange takes much time, which raises mounting work cost.

SUMMARY OF THE INVENTION

The present invention has been made in order to solve the problems of a gasket made of rubber used for a resin flange and a main object thereof is to provide a metal gasket having a high reliability wherein an appropriate amount of compression and resilience is secured and buckling is suppressed so that it can be fit for long term use, owing to the fact that only the elastically deformable region is used in processes, in which beads are compressed, when a flange is secured by screwing, by using a structure, which can suppress compressing load on the beads to a low value.

In order to achieve the above object, the present invention is characterized in that a metal gasket used for a flange made of synthetic resin comprises at least one elastic metal plate, on which a bead is formed.

DESCRIPTION OF THE PREFERRED EMBODIMENTS

Figure 1:
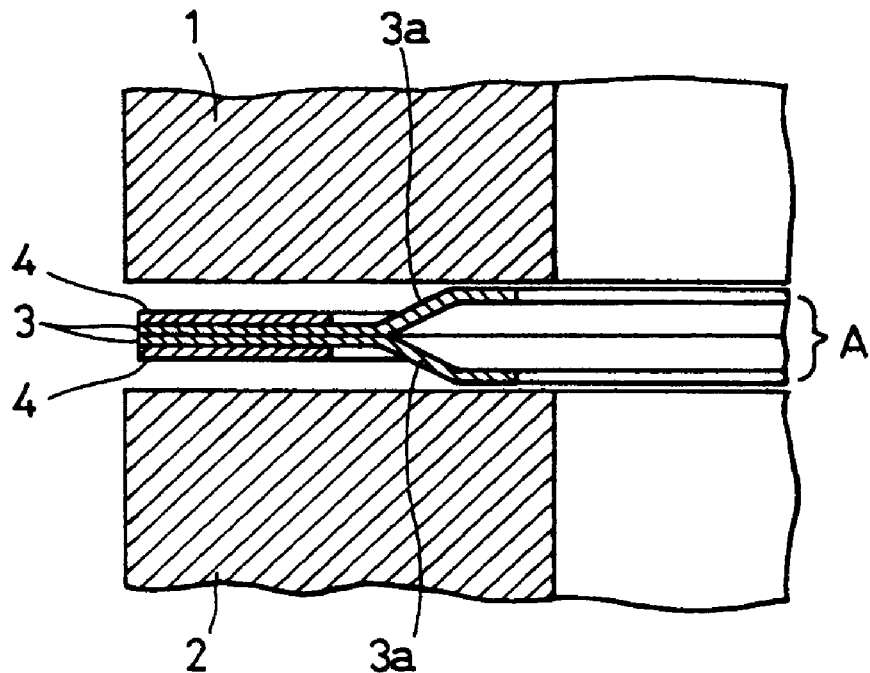
FIG. 1 is a longitudinal cross-sectional view indicating a principal part of a metal gasket showing an embodiment of the present invention.

FIG. 1 shows an embodiment of the present invention.

In FIG. 1, reference numeral 1 represents a resin flange; 2 an aluminium flange; and A a metal gasket according to the present invention.

In the metal gasket A, two elastic metal plates 3, 3 superposed on each other are used as core material. On each of the elastic metal plates 3, 3 a half bead 3a, 3a bent stepwise is formed so that they have steps opposite to each other. Parts of the elastic metal plates superposed on each other in the neighborhood of the half bead are jointed to each other by using appropriate mean. A rubber coating or an elastic layer made of rubber mounted later, which is contacted with a flange is formed on a surface of the half beads 3a, 3a. 4 is a metal shim plate superposed on the part of the elastic metal plate superposed on the other in the neighborhood of the half bead 3a and jointed thereto.

Stainless steel plates such as SUS301H, etc. are used for the elastic metal plates 3, 3. The most preferable thickness is 0.1 mm. However, plates 0.1 mm to 0.3 mm thick can be used. Among them plates 0.1 mm to 0.2 mm thick are apt to give the parts of beads a large amount of compression and resilience under a small load. More preferably it is desirable to use plates 0.1 mm to 0.15 mm thick.

Rubber such as NBR and HNBR is used for the rubber elastic layers formed on surfaces of the half beads 3a, 3a of the elastic metal plates 3, 3.

The kind of rubber can be selected arbitrarily, depending on environment, in which the gasket is used. For example, nitryl rubber, styrene butadiene rubber, isoprene rubber, chloroprene rubber, butadiene rubber, butyl rubber, ethylene-propylene rubber, fluorocarbon rubber, silicone rubber, chlorosulphonized polyethylene, ethylene vynil acetate rubber, polyethylene chloride, butyl chloride rubber, epichlorohydrin rubber, nitryl isoprene rubber, natural rubber, etc. may be used therefor.

Rubber, with which the metal plate is coated, is preferably 20 to 100 μm thick. Not only rubber which is not foamed but also foamed rubber may be used therefor. In this case thickness comprised between 150 and 1500 μm can be used.

Figure 2:
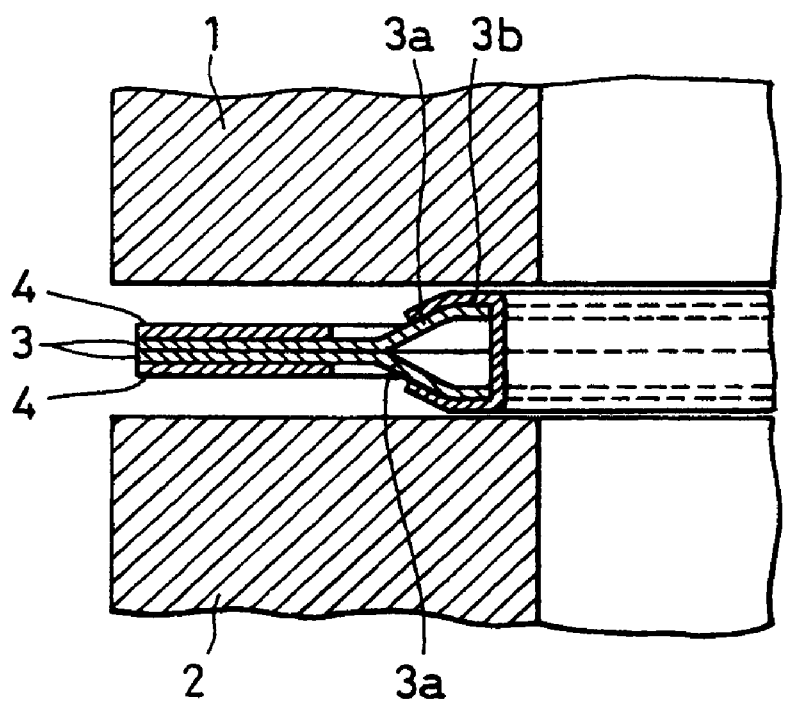
FIG. 2 is a longitudinal cross-sectional view indicating a principal part of a metal gasket showing another embodiment of the present invention.

Further a ring-shaped product 3b having a U-shaped cross-section made of rubber several mm thick may be mounted later on the metal plates, as indicated in FIG. 2.

Since the metal gasket A constructed as described above has the half beads 3a, 3a bent stepwise formed so as to have steps opposite to each other, when the flanges are tightened, both the half beads 3a, 3a are brought into contact elastically with surfaces of the flanges to form sealing planes.

Consequently, using the metal gasket A, following functions and effects can be obtained.

(a) Owing to the half beads bent stepwise so as to have steps opposite to each other, it is possible to obtain a desired sealing property in a low load region of the beads and only in the elastic region.

(b) Since bending in a state, where the gasket is tightened, can be suppressed to an extremely small value (at a same level as in the case where the flanges are tightened without gasket), it is possible to remove worsening in flatness (planarity) of the flange made of resin.

(c) It is possible to suppress aggressiveness to the resin by dispersing load concentrated to the part of the bead by means of the rubber elastic layers disposed on the surfaces of the half beads contacted with the flange surfaces. In addition, it is possible to disperse further the concentrated load to prevent aggression to the resin by using foam rubber layers for the rubber elastic layers.

(d) Since the amount of compression of the half beads can be restricted to a small value by using shim plates together, it is possible to prevent worsening of the surface of the resin flange due to marks by striking. In addition, since it is possible to suppress bending of the flanges at tightening, worsening of the planarity of the resin flange can be prevented. (If bending thereof at tightening is great, deformation of the resin can be aggravated, depending on environments of use (in particular thermal load.)

(e) Since deformation of the half beads, when they follow movement of the flanges, takes place within the elastic region thereof, it is sufficient for the rubber elastic layers to obtain initial fitness to the flanges. Therefore it is unnecessary to use expensive materials such as prior art O-rings. As the result, low cost can be realized.

Further, also in case where the rubber product 3b is mounted later, since resilience thereof can be combined with the amount (force) of resilience of the elastic metal plate, differently from that by prior art rubber products (e.g. 6 to 8 mm thick) the sealing property is maintained only by elasticity of the rubber, reduction in the material cost can be realized, as described previously.

(f) Since the half beads themselves are used in the elastic region, no buckling due to repeating load, etc. takes place and the reliability on the sealing property can be improved.

(g) Since the core material of the gasket is metal having a definite form, it can be mounted automatically and work-ability (easiness of mounting) can be maintained at a same level as in case where aluminium flanges are used.

(h) Also in case where it is necessary to dismount the flanges and to mount them again because of maintenance or some inconveniences in the market, since worsening of the surfaces of the flanges is restricted, it can be dealt with by replacing only the gasket similarly to the case where aluminium flanges are used.

Figure 3:
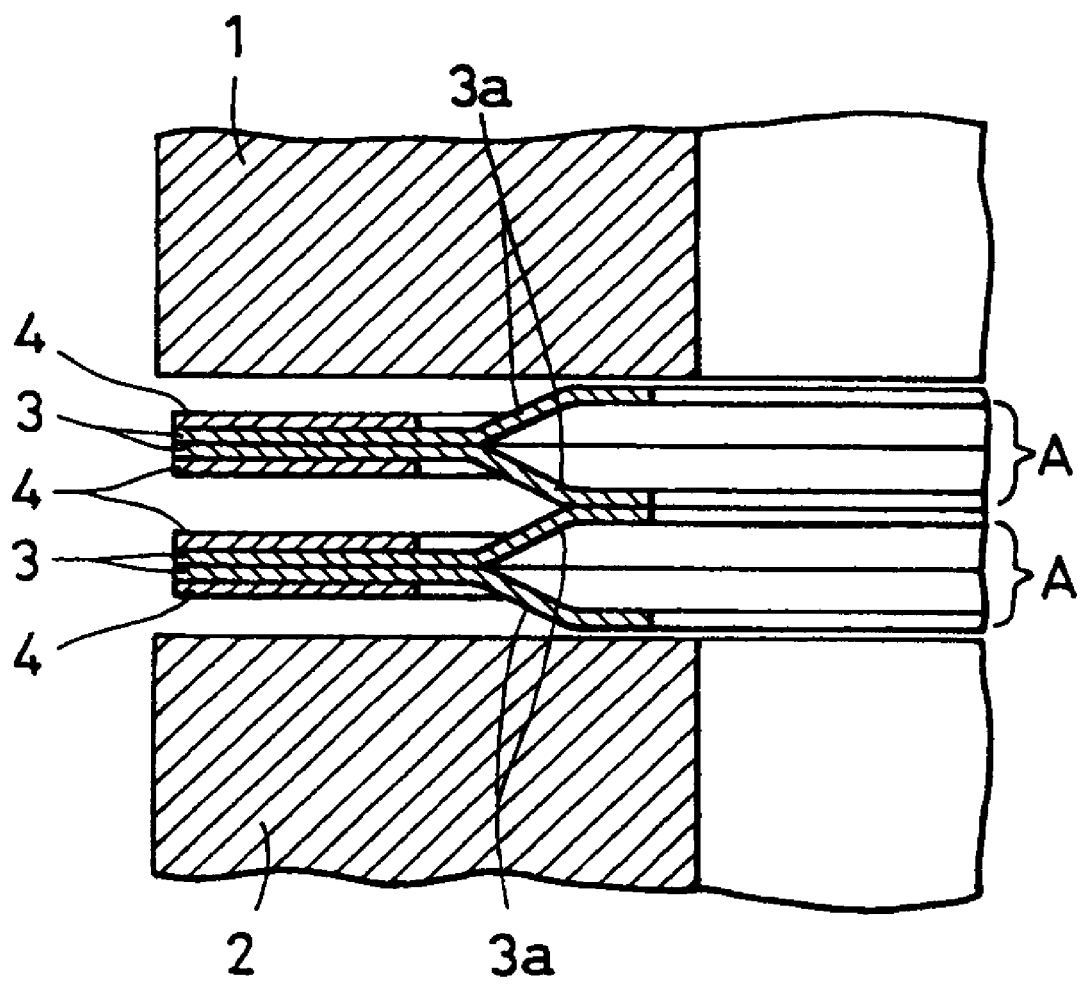
FIG. 3 is a longitudinal cross-sectional view indicating a principal part of a metal gasket showing still another embodiment of the present invention.

FIG. 3 shows an example, in which two metal gaskets A indicated in FIG. 1 are superposed on each other to be arranged.

Owing to the construction described above, it is possible to regulate the amount of compression and resilience as gasket by changing the number of bead plates and the thickness of the shim plates, depending on the planarity and thermal distortion of the resin flange.

Figure 4:
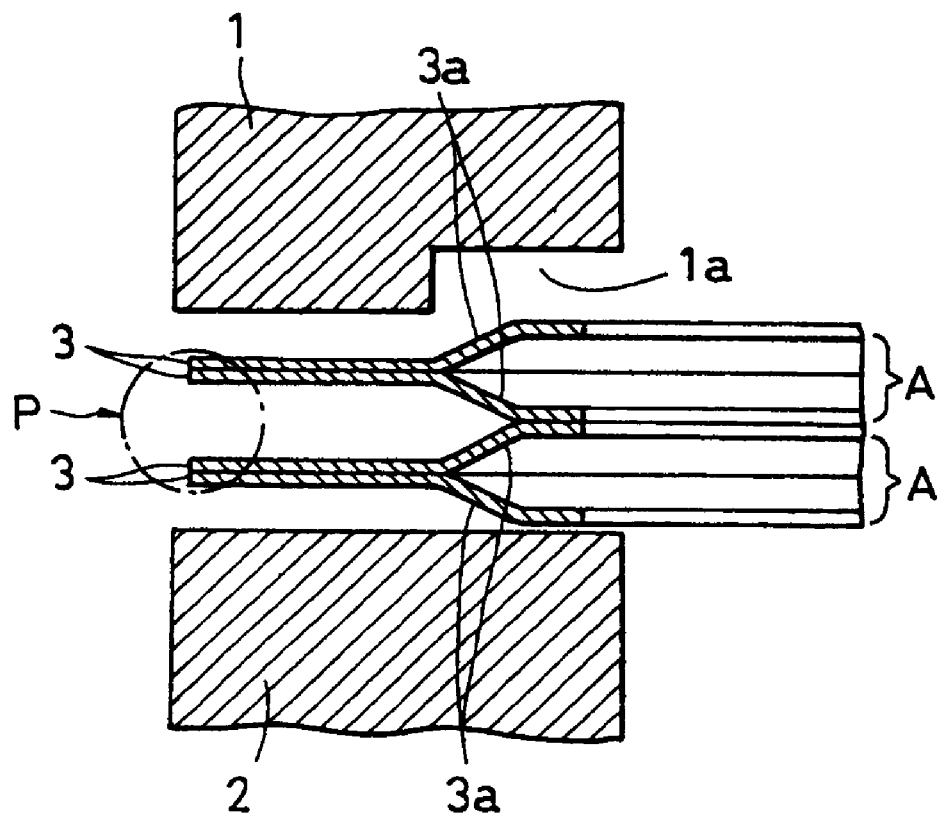
FIG. 4 is a longitudinal cross-sectional view indicating a principal part of a metal gasket showing still another embodiment of a metal gasket showing still another embodiment of the present invention.

FIG. 4 shows an example, in which the shim plates can be omitted by disposing a step 1a in the resin flange. Since it is possible to change the amount of deformation of the half beads by this construction, regulation can be effected so as to give the beads a large amount of compression and at the same time a large amount of resilience by a small load.

Figure 5:
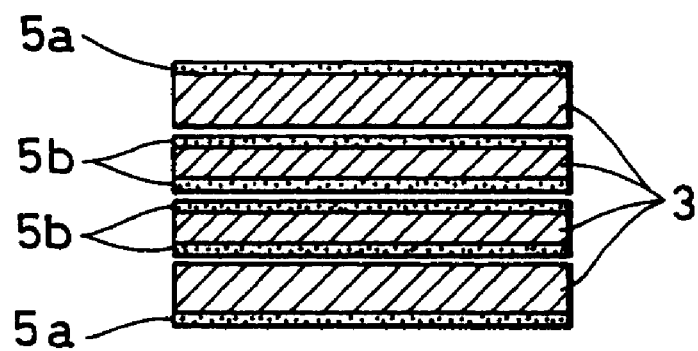
FIG. 5 is a partial enlarged cross-sectional view of FIG. 3.

FIG. 5 shows a part P in FIG. 4 in detail in an enlarged scale.

In FIG. 5, 3 indicates an elastic metal plate 0.1 mm thick and 5a and 5b represent elastic layers formed by coating with rubber. The rubber elastic layer 5a on the elastic metal plate 3 on the outer side is 50 to 100 μm thick, while the rubber elastic layer 5b on the elastic metal plate 3 on the inner side is 10 to 30 μm thick.

Figure 6:
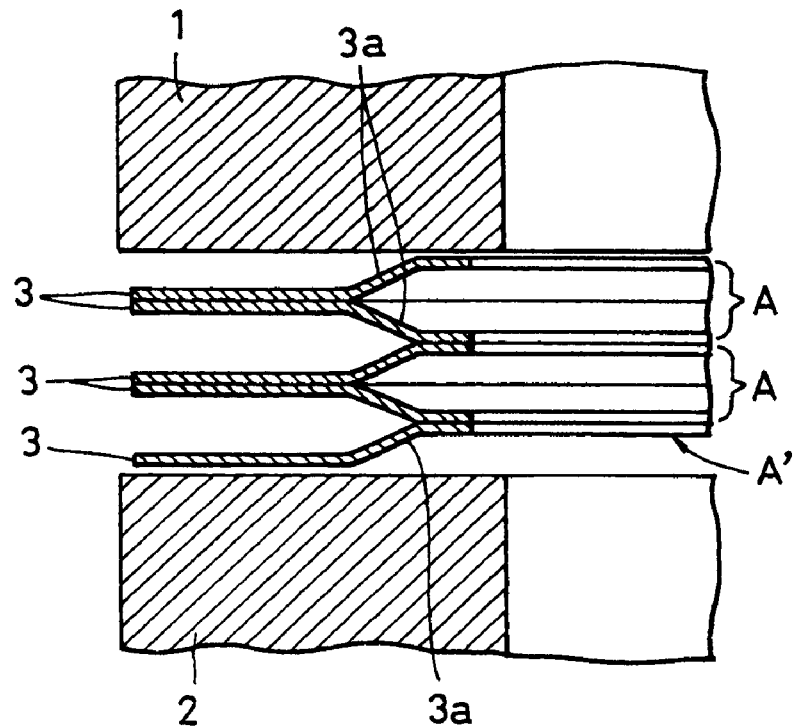
FIG. 6 is a longitudinal cross-sectional view indicating a principal part of a metal gasket showing still another embodiment of the present invention.

FIG. 6 shows an example, in which a single elastic metal plate 3 having a half bead 3a (A') is superposed further on one metal gasket A between the two metal gaskets A, A superposed on each other in FIG. 4 in a state where the half beads are superposed on each other.

Owing to the construction it is possible to raise further the amount of compression and resilience of the half beads.

Figure 7:
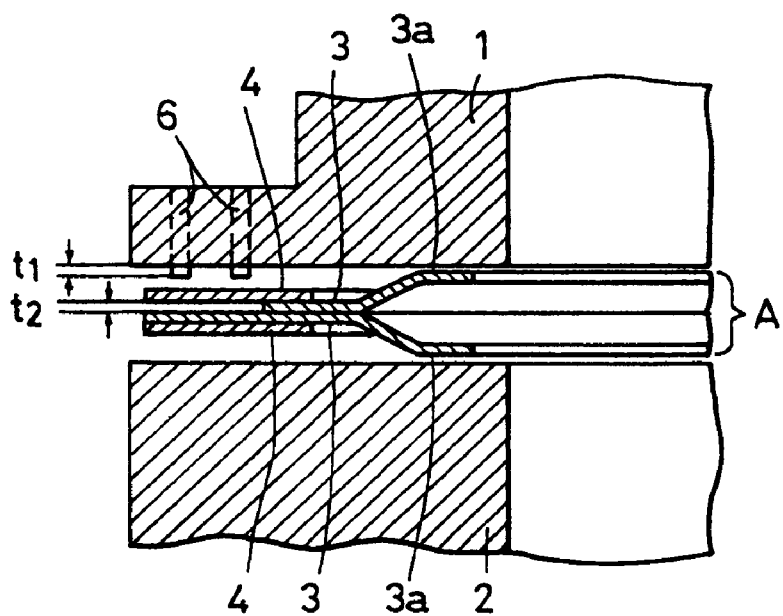
FIG. 7 is a longitudinal cross-sectional view indicating a principal part of a metal gasket showing still another embodiment of the present invention.

FIG. 7 shows still another embodiment of the present invention.

In the present embodiment, a soft foam rubber layer is formed on the half bead 3a of the elastic metal plate brought into contact with the resin flange 1 between the two elastic metal plates 3, 3 constituting the metal gasket A and further the relevant elastic metal plate 3 is shorter than the other elastic metal plate 3, the two elastic metal plates 3, 3 being put between two shim plates 4, 4. On the other hand, tube-shaped metal collars 6 inserted into the resin flange 1 for the purpose of reinforcing inner walls of holes, through which screws are made pass, protrude outside of the flange. In the figure, representing the whole thickness of a metal plate and a foam rubber layer, when they are compressed by screwing, by $t_2$ and a protruding margin of the collars 6 by $t_1$, $t_1=t_2$. For example, in case where the metal plate is 0.1 mm thick and the foam rubber layer is 0.5 mm thick, the sum $t_1$ of the thickness of the metal plate, which is 0.1 mm, and the thickness of the foam rubber, which is 0.1 mm, at tightened =0.2 mm.

Owing to the above described construction, it is possible to disperse the concentrated load at the beads to lighten marks of striking by bringing a foam rubber layer softer than a hard rubber layer into contact with the surface of the resin flange. In addition, it is possible to decrease the number of bead plates (reduction in cost) owing to increase in resilience of the rubber layer and further to prevent decrease in torque due to buckling of the elastic rubber layer by deciding the protruding margin $t_1$ of the collars so as to be equal to the thickness $t_2$ of the metal plate.

Figure 8:
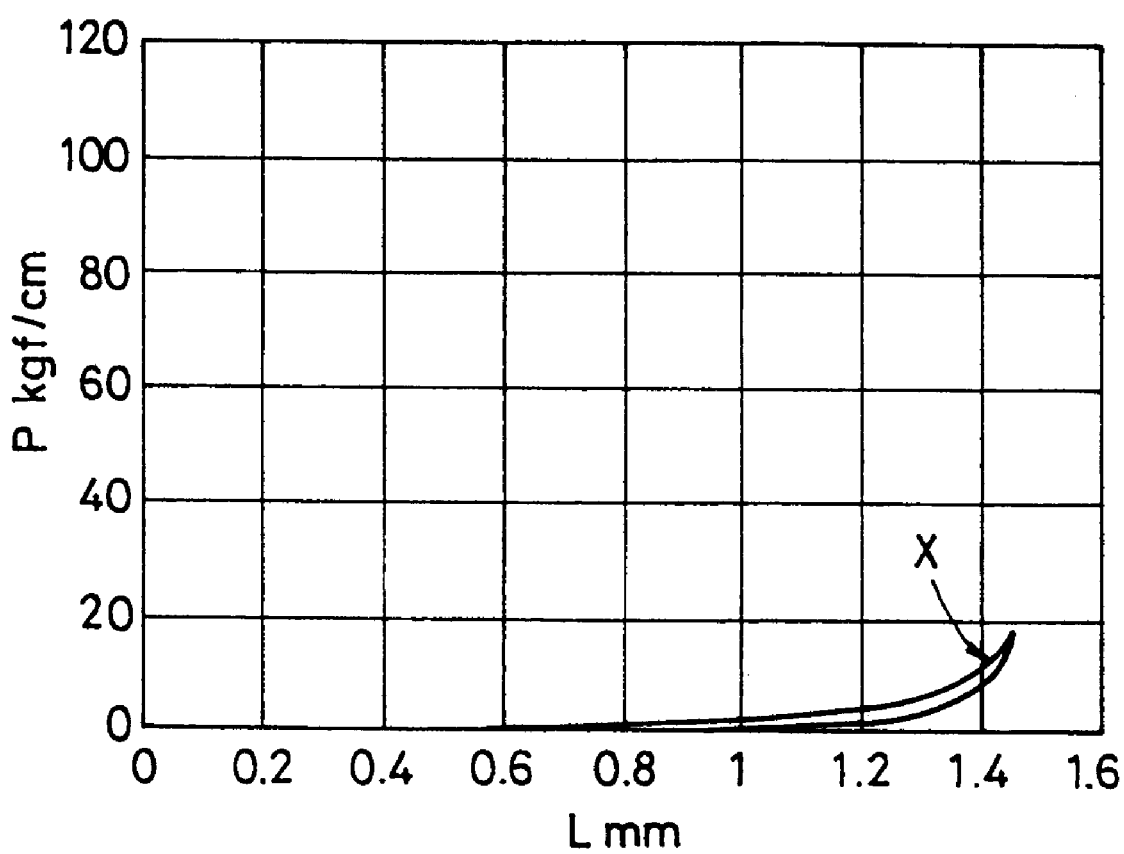
FIG. 8 is a graph indicating compression-resilience characteristic of the metal gaskets according to the present invention.
Figure 9:
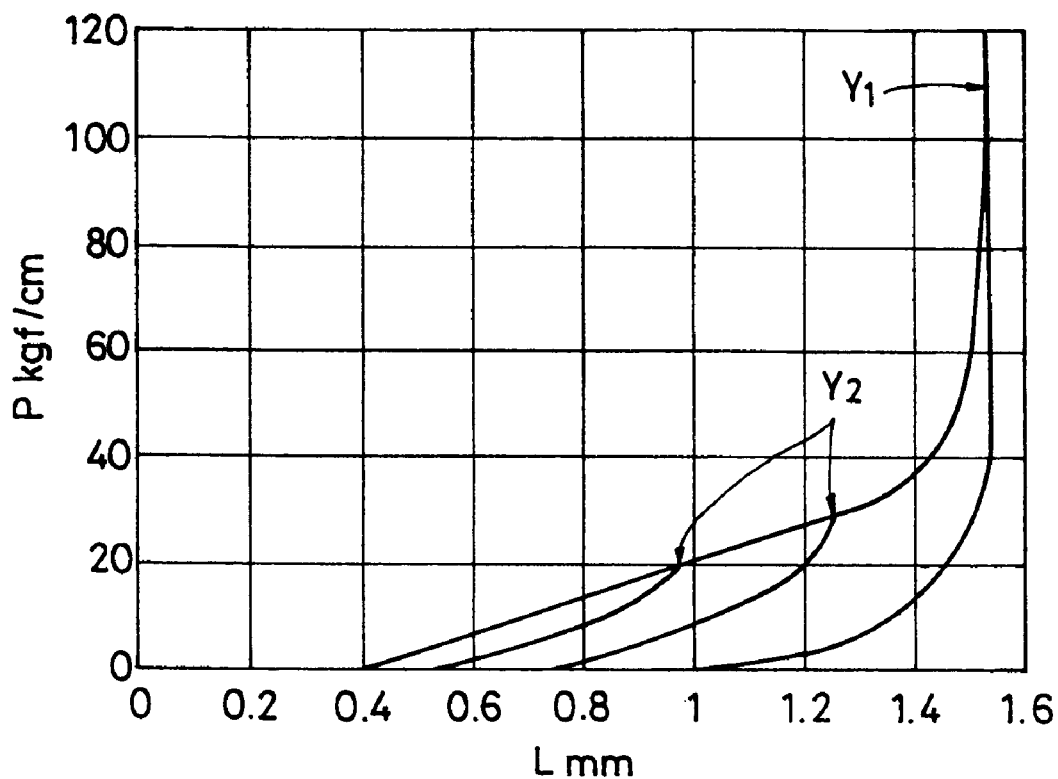
FIG. 9 is a graph indicating compression-resilience characteristics of a prior art metal gasket.
Figure 10:
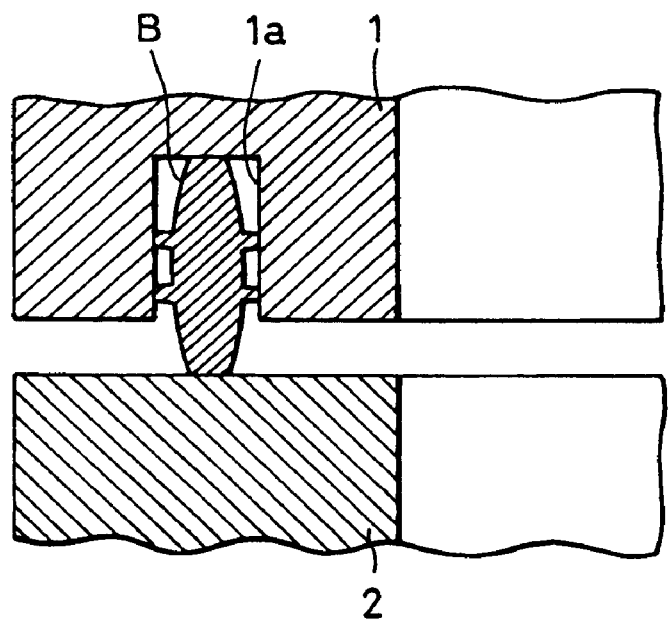
FIG. 10 is a longitudinal cross-sectional view indicating a principal part of a prior art metal gasket.

FIG. 8 shows compression-resilience characteristics of the metal gasket according to the present invention, while FIG. 9 shows compression-resilience characteristics of a prior art metal gasket. These figures indicate variations of the linear pressure (load) P applied to the bead with respect to variations of the displacement L of the bead. In FIG. 9, $Y_1$, is a curve obtained when a prior art bead is compressed by a total pression and $Y_2$ indicates that it is possible to decrease the linear pressure (compression strength) of the bead by using shim plates together.

For these measurements, four elastic metal plates with half beads 0.1 mm thick made of SUS301H were used for the gasket according to the present invention, while four elastic metal plates with half beads 0.2 mm thick made of SUS301H were used for the prior art gasket.

As indicated in FIG. 9, for the prior art metal gasket, e.g. a load of 85 kgf/cm is required in order to give the bead a displacement of about 1.5 mm. On the contrary, for the metal gasket according to the present invention, a small load (about 10 kgf/cm) is sufficient to give the same displacement by using shim plates on the outer periphery side of the bead plates.

Further, as indicated by X in FIG. 8, in case where the same displacement is given, it is possible to decrease the absolute value of the compression strength of the bead to a value as low as 1/10 by decreasing the thickness of the elastic metal plates, on which the beads are formed, (e.g. 0.1 mm) with respect to the prior art gasket.

As indicated by the compression-resilience characteristics in FIG. 8, since it is possible to design so as to use only the elastic region of the beads, buckling due to vibration (repeated load) can be reduced to zero.

In addition, according to the present invention, the amount of compression and resilience can be arbitrarily regulated by varying the height of the beads, the number of elastic metal plates having beads superposed on each other, and the thickness of shim plates. For example, the amount of resilience can be increased by increasing the number of superposed bead plates, and on the other hand the amount of compression can be increased by decreasing the thickness of the shim plates for a same height of the beads.

The embodiments indicated in FIGS. 1 to 7, are based on the construction, in which two elastic metal plates having half beads are superposed on each other so that the half beads are directed opposite to each other. However the beads may be full beads. Further the sealing property may be secured even by a construction consisting of one elastic metal plate having a half bead or a full bead.

As described above in detail, since bending in a state, where the gasket is tightened, can be suppressed to an extremely small value at a same level as in the case where the flanges are tightened without gasket, it is possible to remove worsening in flatness (planarity) of the flange made of resin.

In addition, since the amount of compression of the half beads can be restricted to a small value by using shim plates together, it is possible to prevent worsening of the surface of the resin flange due to marks of striking.

Also in case where it is necessary to dismount the flanges and to mount them again because of maintenance or some inconveniences in the market, since worsening of the surfaces of the flanges is restricted, there is an advantage that it can be dealt with by replacing only the gasket similarly to the case where aluminium flanges are used.

Further, since deformation of the half beads, when they follow movement of the flanges, takes place within the elastic region thereof, it is sufficient for the rubber elastic layers to have obtain initial fitness to the flanges. Therefore it is unnecessary to use expensive materials such as prior art O-rings. As the result, low cost can be realized.

Still further, since the half beads themselves are used in the elastic region, no buckling due to repeating load, etc. takes place and the reliability on the sealing property can be improved.

In addition, since the core material of the gasket is metal having a definite form, it can be mounted automatically and workability (easiness of mounting) can be maintained at a same level as in case where aluminium flanges are used.

What is claimed is:

1. A combination of a metal gasket oriented between spaced apart first and second flanges comprising:

at least said first flange being composed of a synthetic resin material;

a plurality of elastic metal plates disposed between said first flange and said second flange, a bead being formed on at least one of said elastic metal plates configured to engage said first flange;

a step formed on said first flange and configured to receive said head;

a half bead being formed on each of said plurality of elastic metal plates;

said plurality of elastic metal plates including two sets of elastic metal plates superposed on each other, wherein each of said two sets includes two elastic metal plates that are superposed on each other and oriented so that said half beads of said elastic metal plates are directed opposite to each other; and a fifth elastic metal plate having a half bead being disposed on said plurality of elastic metal plates so that said half bead of said fifth elastic metal plate is superposed on one of said half beads of said plurality of elastic metal plates.

2. A combination of a metal gasket oriented between spaced apart first and second flanges comprising:

at least said first flange being composed of a synthetic resin material;

a plurality of superposed elastic metal plates disposed between said first flange and said second flange;

a bead being formed on at least one of said elastic metal plates configured to engage said first flange;

shim plates superposed on said elastic metal plates outside of said beads and configured to be attached thereto;

a half bead being formed on each of said plurality of elastic metal plates;

said plurality of elastic metal plates including two sets of elastic metal plates superposed on each other, wherein each of said two sets includes two elastic metal plates that are superposed on each ocher and oriented so that said half beads of said elastic metal plates are directed opposite to each other; and a fifth elastic metal plate having a half bead being disposed on said plucality of elastic metal plates so that said half bead of said fifth elastic metal plate is superposed on said half bead of one of said plurality of elastic metal plates.

3. A combination of a metal gasket oriented between spaced apart first and second flanges comprising:

at least said first flange being composed of a synthetic resin material;

a plurality of superposed elastic metal plates disposed between said first flange and said second flange;

a bead being formed on at least one of said elastic metal plates configured to engage said first flange;

shim plates superposed on said elastic metal plates outside of said beads and configured to be attached thereto;

a half bead being formed on each of said plurality of superposed elastic metal plates;

said plurality of superposed elastic metal plates includes two elastic metal plates oriented so that said half beads are directed opposite to each other; and one of said two elastic metal plates being shorter than the other of said two elastic metal plates.

4. A combination of a metal gasket oriented between paced apart first and second flanges comprising:

at least said first flange being composed of a synthetic resin material;

a plurality of superposed elastic metal plates disposed between said first flange and said second flange;

a bead being formed on at least one of said elastic metal plates configured to engage said first flange;

shim plates superposed on said elastic metal plates outside of said beads and configured to be attached thereto;

one of said plurality of elastic metal plates being shorter than an other of said plurality of elastic metal plates, said plurality of elastic metal plates being positioned between said shim plates; and tube-shaped metal collars inserted into said first flange and protruding outside of said first flange toward the metal gasket.

* * * * *